United States Patent [19]
Gotoh et al.

[11] Patent Number: 5,992,914
[45] Date of Patent: *Nov. 30, 1999

[54] TRIM MEMBER FOR VEHICLE

[75] Inventors: Youji Gotoh, Wako; Yukihiro Yamaguchi, deceased, late of Wako; by Mituo Yamaguchi, legal representative, Tokyo; Yutaka Ohno, Wako; Osamu Takezawa, Wako; Tomoyuki Uemura, Wako, all of Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/773,305

[22] Filed: Dec. 24, 1996

[30] Foreign Application Priority Data

Dec. 27, 1995 [JP] Japan ................................ 7-352059

[51] Int. Cl.⁶ .................................................. B60R 21/04
[52] U.S. Cl. .......................... 296/39.1; 296/189; 280/751
[58] Field of Search ................. 296/189, 39.1; 280/751

[56] References Cited

U.S. PATENT DOCUMENTS

| 5,362,102 | 11/1994 | Hajek et al. | 280/751 |
| 5,419,606 | 5/1995 | Hull et al. | 296/39.1 X |
| 5,575,500 | 11/1996 | Mimura et al. | 280/751 |
| 5,609,385 | 3/1997 | Daniel et al. | 280/751 X |
| 5,660,426 | 8/1997 | Sugimori et al. | 280/751 X |
| 5,709,407 | 1/1998 | Stephens et al. | 280/751 |
| 5,762,392 | 6/1998 | Suga | 296/189 X |
| 5,791,716 | 8/1998 | Takagi et al. | 280/751 X |

FOREIGN PATENT DOCUMENTS

| 4015375 | 11/1991 | Germany | 280/751 |
| 406239189 | 8/1994 | Japan | 280/751 |
| 7-2029 | 1/1995 | Japan . | |
| 7-2030 | 1/1995 | Japan . | |

*Primary Examiner*—D. Glenn Dayoan
*Assistant Examiner*—Chad D Wells
*Attorney, Agent, or Firm*—Armstrong, Westerman, Hattori, McLeland & Naughton

[57] ABSTRACT

A trim member for a vehicle having an excellent shock absorbing performance is provided. The trim member is provided in a car-room and has a surface opposite to a car-body member at a distance, a plurality of ribs capable of elastic and plastic deformation formed on the surface and extending in different directions crossing each other, a pedestal portion for abutting against the car-body member and an attachment portion to be fixed to the car-body member. The pedestal portion and the attachment portion are formed on at least one of crossing portions of the ribs.

2 Claims, 9 Drawing Sheets

TRIM MEMBER FOR VEHICLE

BACKGROUND OF THE INVENTION

This invention relates to a trim member for a vehicle such as a motorcar, and particularly to the trim member having a function to mitigate a shock.

Figure 1:
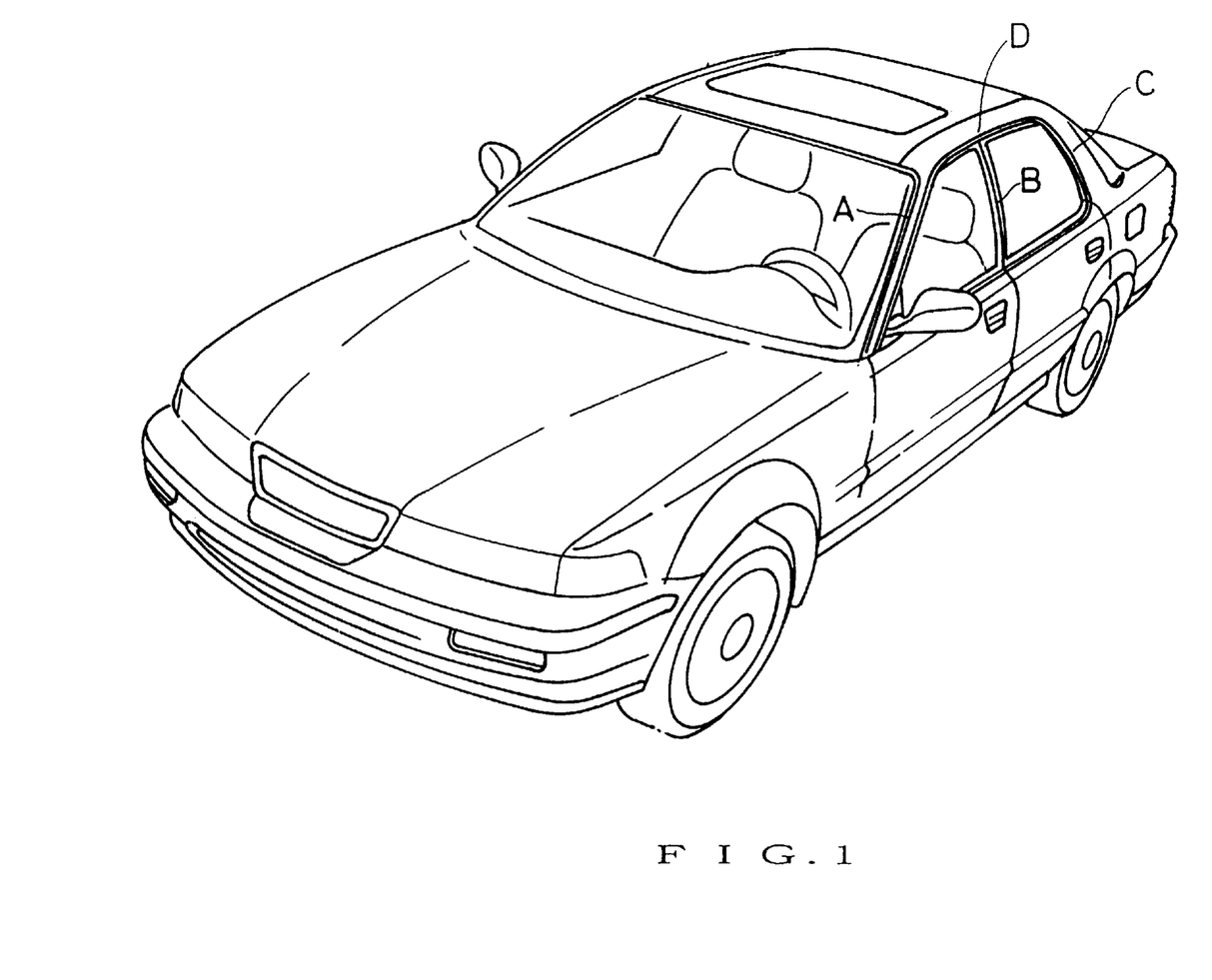
FIG. 1 is a perspective view showing a general construction of a motorcar body.

Generally, a body of a motorcar is formed by basic frame members of closed sections such as front pillars A, center pillars B, rear pillars C and roof side rails D as shown in FIG. 1, and inside of the basic frame member facing to the car-room is covered with a trim member called a garnish. Hitherto, a main object of the trim member was to cover uneven portions of the basic frame member for ornament, therefore the trim member had a rib arrangement structure giving the trim member a rigidity barely sufficient for keeping its own shape, and had no sufficient function to absorb and mitigate a shock applied to the member.

Recently, such a trim member also has been required to have a shock energy absorbing function and a shock absorptive trim member for a motorcar is proposed by Japanese Patent Laid-Open Publication No. Hei 7-2029 or No. Hei 7-2030 for example.

The shock absorptive trim member is made of a formed hollow article of plastic and has a top face portion positioned at a car-room side for receiving a shock, first and second outer wall face portions formed on both sides of the top face portion, first and second inner wall portions formed on an inner side of the top face portion, a first bottom face portion formed between the first outer wall face portion and the first inner wall face portion, and a second bottom face portion formed between the second outer wall face portion and the second inner wall face portion. The first and second bottom face portions are positioned at a car-body side to be fixed to the car-body.

However, since the shock absorptive trim member has a complicated hollow shape in which various wall face portions are arranged between the top face portion and the bottom face portion, its forming work is troublesome and dimensional accuracies of the wall faces are apt to be unstable to influence the shock absorbing performance.

SUMMARY OF THE INVENTION

Therefore, an object of the present invention is to provide a trim member which can be produced without changing the customary production technique arranging ribs on a surface of the trim member main body and yet has an excellent shock absorbing performance.

In order to accomplish the aforesaid object, the present invention provides a trim member for a vehicle to be provided in a car-room, having a surface opposite to a car-body member at a distance, a plurality of ribs capable of elastic and plastic deformation formed on the surface and extending in different directions crossing each other, and a pedestal portion for abutting against the car-body member and an attachment portion to be fixed to the car-body member formed on at least one of crossing portions of the ribs.

This trim member can be produced easily without changing the customary production technique because it is constituted by arranging ribs on a surface of a trim member main body.

The ribs extend in different directions and the crossing portions of the ribs have sufficient rigidity against compression and bending. And since the trim member abuts on and attached to the car-body at the crossing portions, it elastically bears an impact force applied from the side of the car-room by the rigidity of the crossing portions so long as the impact force reaches a certain value, and when the impact force exceeds a predetermined value, rib structure portions near the crossing portions carry out plastic deformation after elastic deformation to be bent or buckled so that the impact energy is absorbed effectively.

DETAILED DESCRIPTION OF THE PREFERRED EMBODIMENT

Figure 2:
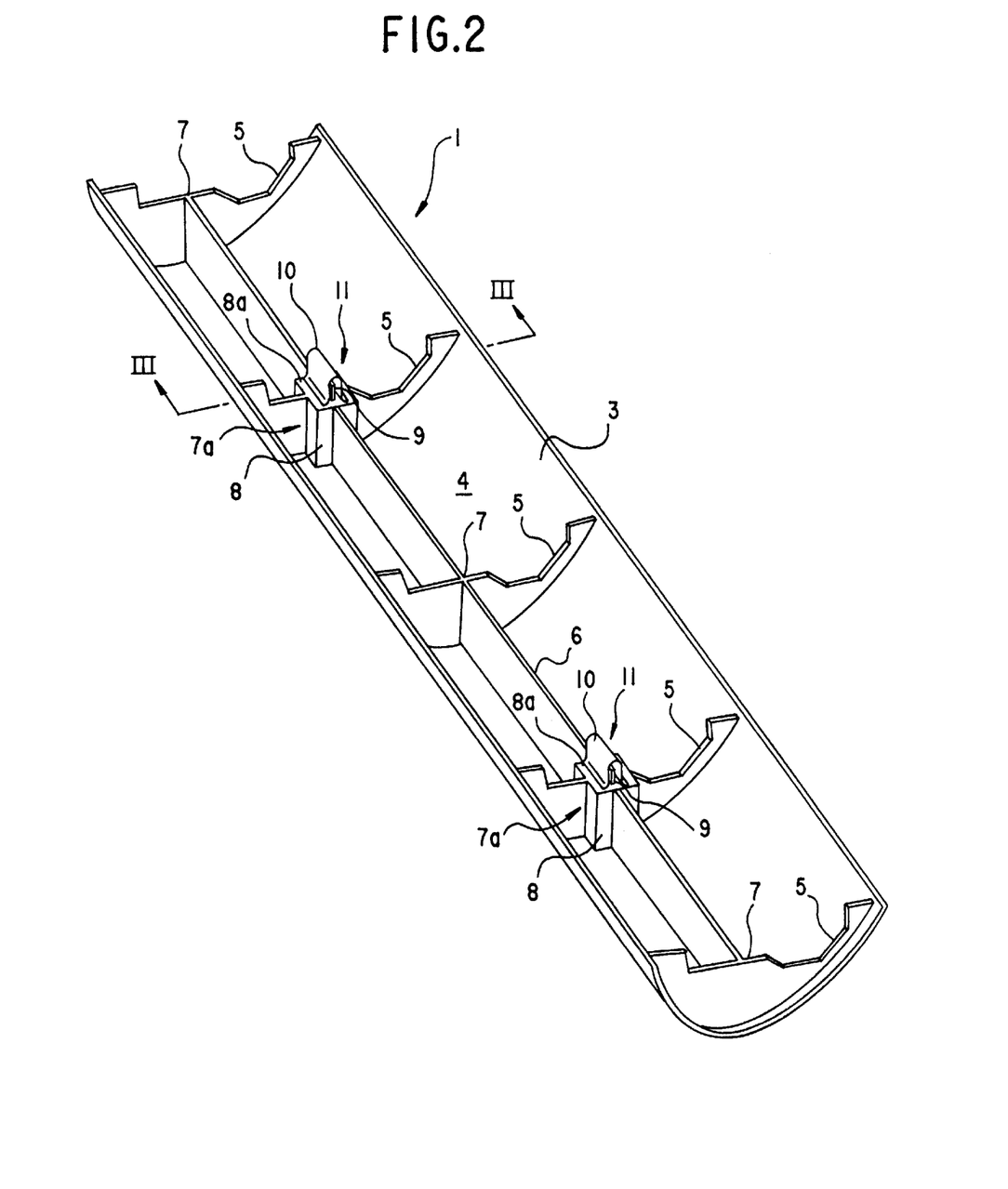
FIG. 2 is a perspective view showing a garnish as an embodiment of the trim member according to the present invention.
Figure 3:
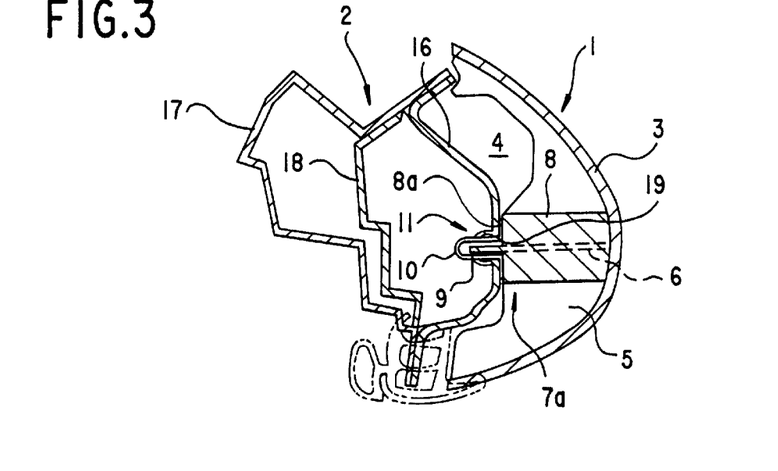
FIG. 3 is a sectional view along the line III—III of FIG. 2 in which a section of a front pillar is also shown.

FIG. 2 is a perspective view showing a garnish 1 as a preferred embodiment of the trim member according to the present invention. This garnish is one for a front pillar and attached to a front pillar 2 as shown in FIG. 3.

The garnish 1 extends along the front pillar 2 and has a main body portion (trim member main body) 3 with a cross section bent about in a U-shape. This main body portion is a portion for covering uneven portions on a surface of the front pillar facing a car-room to exhibit an artistic design effect, therefore hereinafter it is called a garnish design face. Owing to the U-shaped cross section of the garnish design face 3, the garnish 1 has a space 4 formed on the side facing the car-body that is the front pillar 2.

On a surface of the garnish design face 3 at the side of the space 4, many lateral ribs 5 are arranged at regular intervals in the lengthwise direction similarly to such kind of customary garnishes and in addition a longitudinal rib 6 extends in the lengthwise direction crossing the lateral ribs 5 perpendicularly. In this embodiment, the lateral ribs 5 and the longitudinal rib 6 are formed integrally with the garnish design face 3. Namely, the garnish 1 is an integral shaped article of thermoplastic resin material.

On at least some crossing portions 7a among crossing portions 7 of the lateral and longitudinal ribs 5, 6, the ribs 5 and 6 are thickened so as to form a pedestal portion 8 of a square section vertically rising from the garnish design face 3 along a crossing line of the lateral and longitudinal ribs 5, 6. An upper surface of the pedestal portion 8 forms a rectangular or regular square flat pedestal face 8a.

A rectangular plate-like attachment piece 9 is projected from the pedestal face 8a. The attachment piece 9 exists and extends in the same plane as the longitudinal rib 6 and has a thickness equal to that of the longitudinal rib 6 at a portion other than the crossing portion 7a. In other words, the crossing portion 7a has an entire shape correspondent to that the lateral rib 5 is divided at the middle into right and left half parts, at opposite portions of the half parts are provided swelled portions corresponding to half parts of the pedestal portion 8 respectively, the longitudinal rib 6 having a projecting piece corresponding to the attachment piece 9 at the upper edge is interposed between the swelled portions on the both sides, and these portions are formed integrally.

Figure 4:
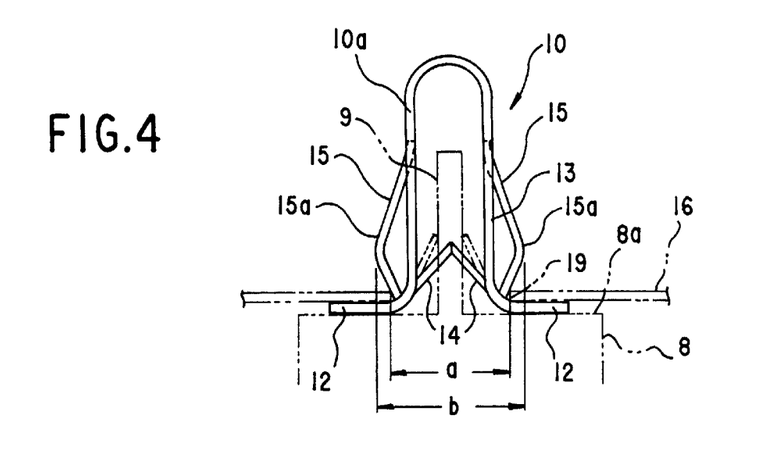
FIG. 4 is an end view of a clip.
Figure 5:
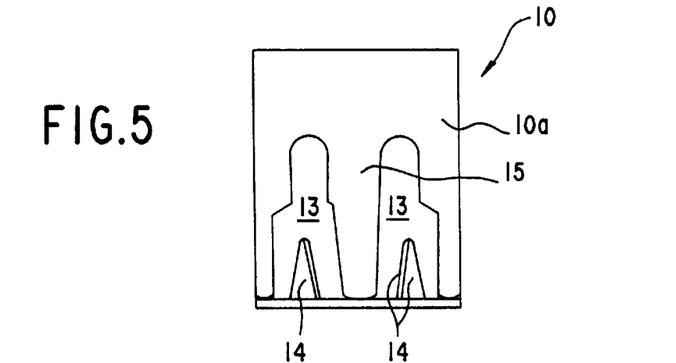
FIG. 5 is a side view of the clip.

The garnish 1 is fixed to and supported by the front pillar 2 at the crossing portion 7a formed with the pedestal portion 8 and the attachment piece 9. For this purpose, an attachment portion 11 having a clip 10 fitted to the attachment piece 9 is formed on the crossing portion 7a. As shown in FIGS. 4 and 5, the clip 10 has a main part 10a formed of a spring steel plate bent in U-shape and at both sides of an open end portion of the main part 10a are formed flanges 12 projecting outward respectively. Both side plates of the main part 10a have holes 13 respectively cut out leaving a pair of first pawls 14, 14 projecting from the aforementioned open end side of the U-shape toward the close end side and a second pawl 15 projecting from the close end side toward the open end side between the first pawls 14, 14.

The first pawls 14 are bent toward the inner side of the main part 10a and each of the pawls 14 on one side plate of the main part 10a has a tip end closely opposed to a tip end of a corresponding pawl 14 on another side plate. A middle portion 15a of the second pawl 15 is formed to swell outward from the corresponding side plate of the main part 10a.

For fitting the attachment piece 9 with the clip 10, the attachment piece 9 is inserted between the first pawls 14, 14 which are opposite to each other and the clip 10 is pushed down until the flanges 12 abuts against the pedestal face 8a of the pedestal portion 8. The clip 10 pinches the attachment piece 9 by a strong spring force of the first pawls 14, 14 and is fixed firmly at a predetermined position on the crossing portion 7a.

The front pillar 2 to be equipped with the garnish 1 has a closed sectional shape composed of a pillar inner 16, a pillar outer 17 and a pillar stiffener 18 as shown in FIG. 3. The pillar inner 16 has an attachment hole 19 in which the above-mentioned attachment portion 11 is inserted and fixed. The attachment hole 19 is shaped as a prolonged hole in accordance with the clip 10. The width a of the hole 19 is narrower than the space b between the swelled portions 15a of the second pawls 15 on both sides and the clip 10 is inserted in the attachment hole 19 in a state that the second pawls 15 are pushed into the main part 10a. The swelled portion 15a of the second pawl 15 is projected outward again after passing the attachment hole 19 so that the clip 10 is prevented from slipping out of the attachment hole 19 and the pillar inner 16 is pressed against the pedestal face 8a of the pedestal portion 8 through the flange 12 to ensure a firm attachment of the garnish 1 to the front pillar 2.

The crossing portion 7a at which the garnish 1 is fixed to and supported by the front pillar 2 has a sufficient rigidity against compression and bending because the lateral rib 5 and the longitudinal rib 6 extending in different directions cross each other at the crossing portion and the thick pedestal portion 8 is provided there. Therefore, when an impact force acts on the garnish design face 3 of the garnish 1 from the car-room side, the garnish 1 bears elastically by the rigidity of the crossing portion 7a so long as the impact force reaches a certain value and the impact force is transmitted to the pillar inner 16 of the front pillar 2 through the pedestal face 8a of the pedestal portion 8.

Figure 6:
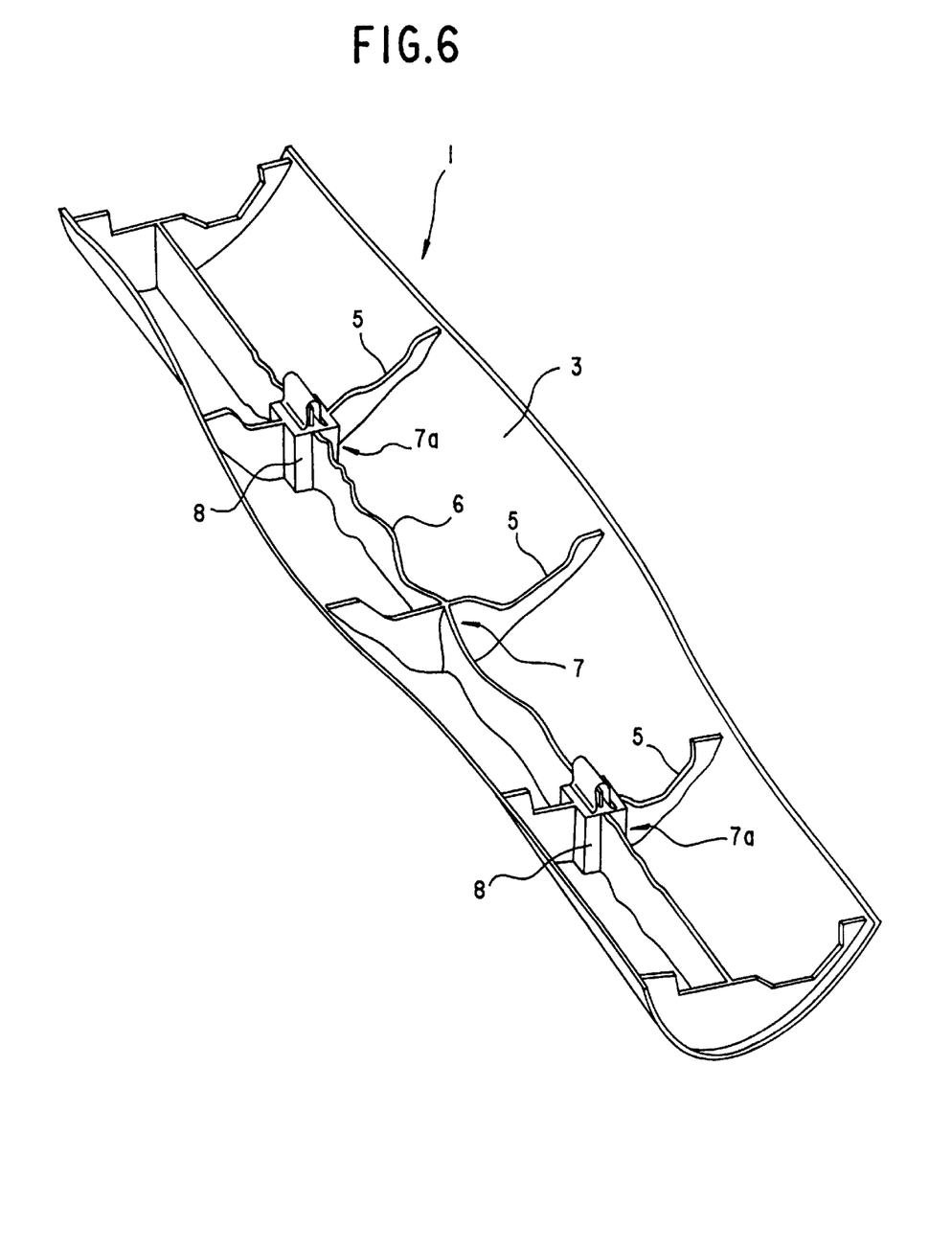
FIG. 6 is a perspective view showing a deformed state of the garnish.

When the impact force exceeds a predetermined value, bending or buckling deformation of the rib structure portions near the crossing portion 7a shifts to plastic deformation after elastic deformation to absorb the impact energy effectively. Namely, an effective shock absorbing function is achieved. At this time, the garnish 1 is deformed as shown in FIG. 6 for example. That is, the lateral ribs 5 forming the crossing portions 7a prevent abrupt openings of the garnish design face 3 and the longitudinal rib 6 is deformed in a collapsed state at both sides of the pedestal portion 8.

As for the customary garnish, since it has only lateral ribs, when a force acts on it from the car-room side, the lateral ribs fall down or buckle by a small force and the force comes to be transmitted to the car-body side directly so that no effective shock absorbing function can be obtained.

On the one hand, since the above mentioned garnish 1 according to the present invention adopts the customary construction that ribs are arranged on one surface of a trim member main body, it can be produced easily without changing the customary trim member producing method.

Figure 7:
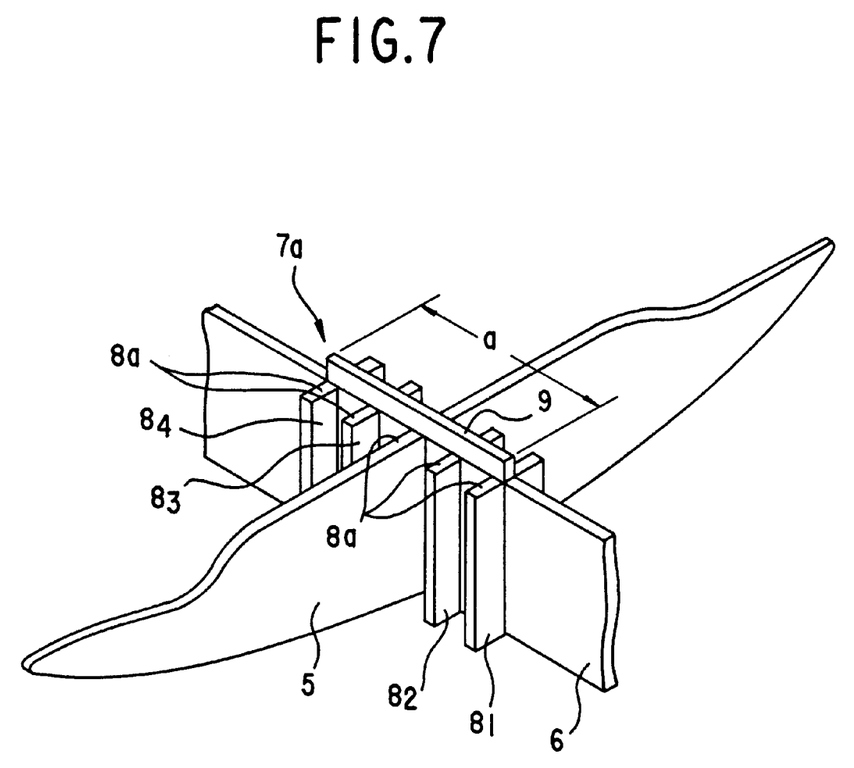
FIG. 7 is an enlarged perspective view showing a modified pedestal portion in the above-mentioned embodiment.

Although the pedestal portion 8 at the crossing portion 7a is formed in a rectangular parallelepiped of one body in the above-mentioned embodiment, the pedestal portion may be constructed by four plate pieces $8_1$, $8_2$, $8_3$, $8_4$ which are arranged on both sides of the lateral rib 5 two by two and projected rightward and leftward from the longitudinal rib 6 as shown in FIG. 7. Upper surfaces of the plate pieces $8_1$–$8_4$ and the lateral rib 5 form a pedestal face 8a for abutting against the front pillar 2 through the flanges 12 of the clip 10.

Figure 8:
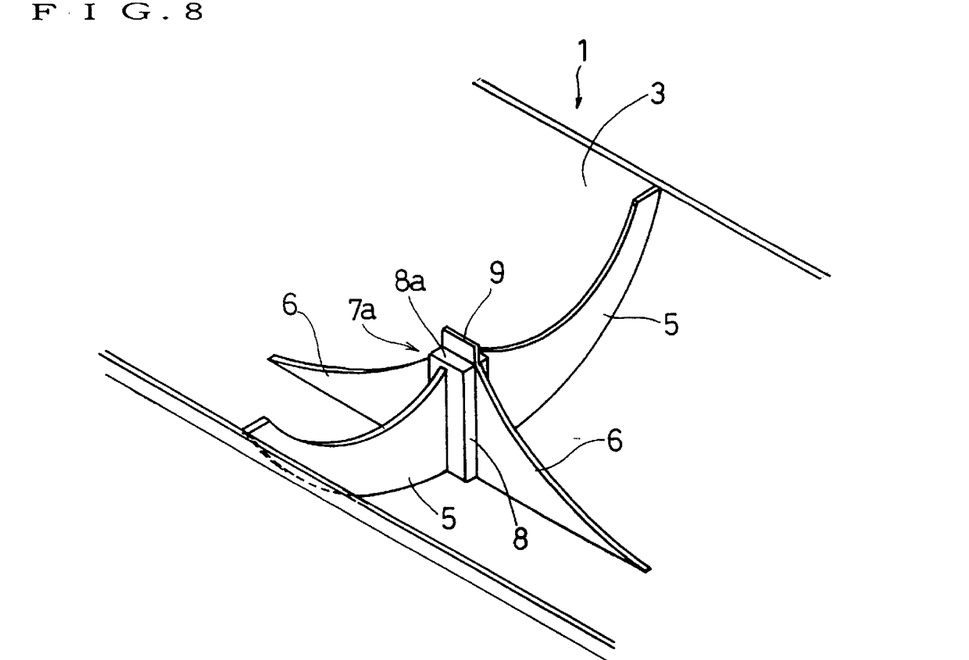
FIG. 8 is a partial perspective view showing a portion near a rib crossing portion according to another embodiment of the invention.

The longitudinal rib 6 which extends continuously in the lengthwise direction over the full length of the garnish 1 in the above embodiment may be cut apart so as to be provided only in the neighborhoods of the crossing portions 7, 7a. FIG. 8 is a partial perspective view showing the neighborhood of a crossing portion 7a in a garnish 1 constructed as above, in which portions corresponding to the portions of the aforementioned embodiment are denoted by the same reference numerals.

Figure 9:
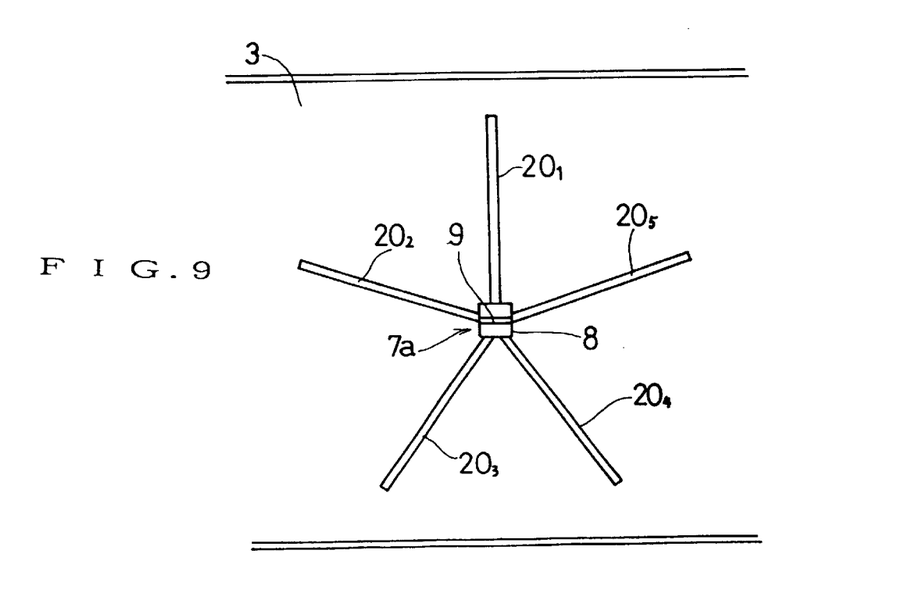
FIG. 9 is a plan view of ribs and a rib crossing portion according to other embodiment.

Ribs to be provided are not always limited to the lateral and longitudinal ribs 5, 6 as described above but may be those extending in any directions. For example, as shown in FIG. 9, five ribs $20_1$, $20_2$, $20_3$, $20_4$, $20_5$ extending in different directions from each other may be gathered to a crossing portion 7a at which a pedestal portion 8 and an attachment piece 9 similar to those described above is formed.

Any ribs 5, 6, 20 in the aforementioned embodiments are formed on the back surface of the garnish design face 3 integrally, but ribs formed separately from the garnish design face 3 may be attached on the back surface of the garnish design face 3. According to such a configuration, it is possible to construct the rib or change the rib thickness at will regardless of the shape of the garnish design face 3.

Figure 10:
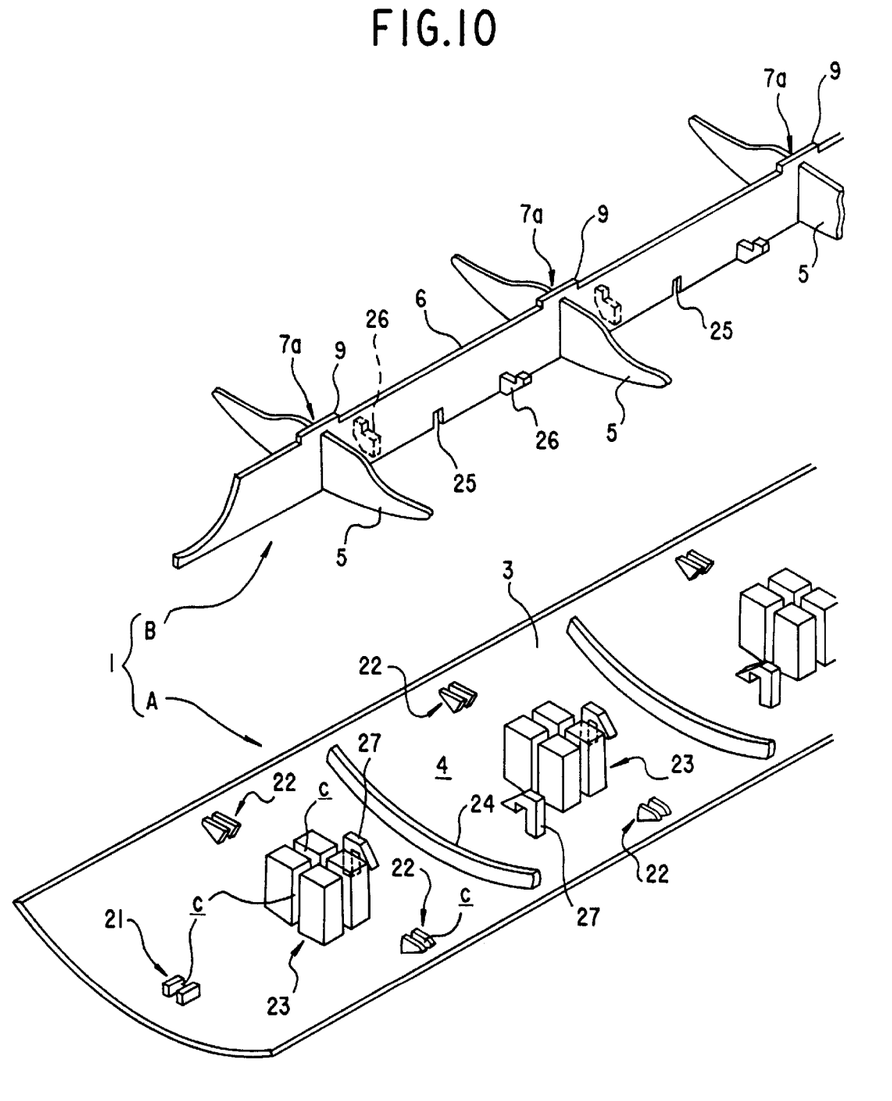
FIG. 10 is a disassembled perspective view of a garnish according to the other embodiment.

FIG. 10 is a disassembled perspective view of a garnish 1 with separate ribs attached to the garnish design face or garnish main body in which the garnish 1 is shown divided into the garnish main body A and a rib structure body B.

The rib structure body B comprises a longitudinal rib 6 to be arranged along the garnish main body A in the lengthwise direction and ribs 5 arranged at regular intervals along the longitudinal rib 6 and projected toward right and left from the rib 6. Portions where the lateral ribs 5 cross the longitudinal rib 6 respectively form the crossing portions 7*a* to be attached to the garnish 1. Accordingly, on an upper edge of the longitudinal rib 6 at the crossing portion 7*a* is projected a attachment piece 9 for fitting with the clip. On the one hand, on a concave of the garnish design face 3 at the side opposite to the car-body are provided longitudinal rib attachment pieces 21 for attaching ends of the longitudinal rib 6, lateral rib attachment pieces 22 for attaching both outer sides of the lateral ribs 5 and crossing portion attachment pieces 23 for attaching the crossing portions 7*a* respectively at predetermined positions corresponding with the rib structure body B.

The attachment pieces 21, 22, 23 have slits c engaging with the ends of the longitudinal rib 6, both outer sides of the lateral ribs 5 and the crossing portions 7*a* respectively, and by fitting corresponding portions in the slits c, the rib structure B is attached onto the garnish design face 3 positioned accurately. The attachment pieces 21, 22, 23 and the garnish design face 3 are all made of thermoplastic resin formed in a body, and the rib structure body B is also made of thermoplastic resin. Therefore, after the rib structure body B is attached to the garnish design face 3 in the manner as described above, both can be fixed firmly by hot-melt adhering of proper portions such as the ends of the longitudinal rib 6 and the longitudinal rib attachment pieces 21, and the both outer sides of the lateral ribs 5 and the lateral rib attachment pieces 22.

Figure 11:
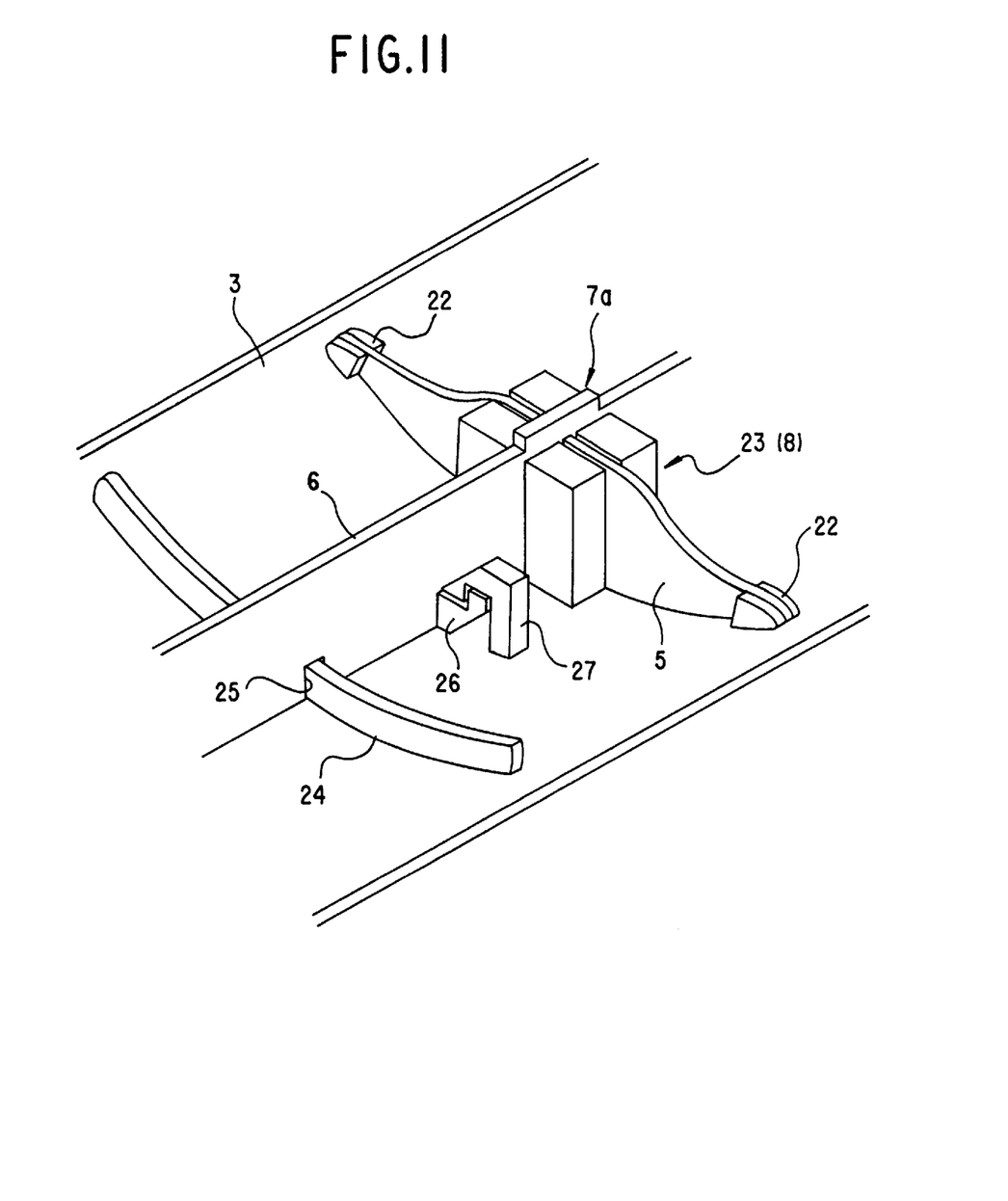
FIG. 11 is a partial perspective view showing assembling of a garnish main body and a rib structure body.

In addition, the garnish design face 3 has lateral reinforcement ribs 24 formed integrally between adjacent crossing portion attachment pieces 23, 23 and the longitudinal rib 5 is provided with cuts 25 for engaging with the reinforcement ribs 24. On both side surfaces of the longitudinal rib 6 are provided projecting engagement pieces 26 properly, and engagement pieces 27 for engaging with the engagement pieces 26 are projected at corresponding places on the garnish design face 3. When the rib structure body B is attached to the garnish main body A in the manner as described above, the reinforcement ribs 24 and the cuts 25, and the engagement pieces 26 and the engagement pieces 27 are engaged with each other respectively to hold the longitudinal rib 6 more stably. And the crossing portion attachment piece 23 forms the pedestal portion 8 at the crossing portion 7*a*.

Figure 12:
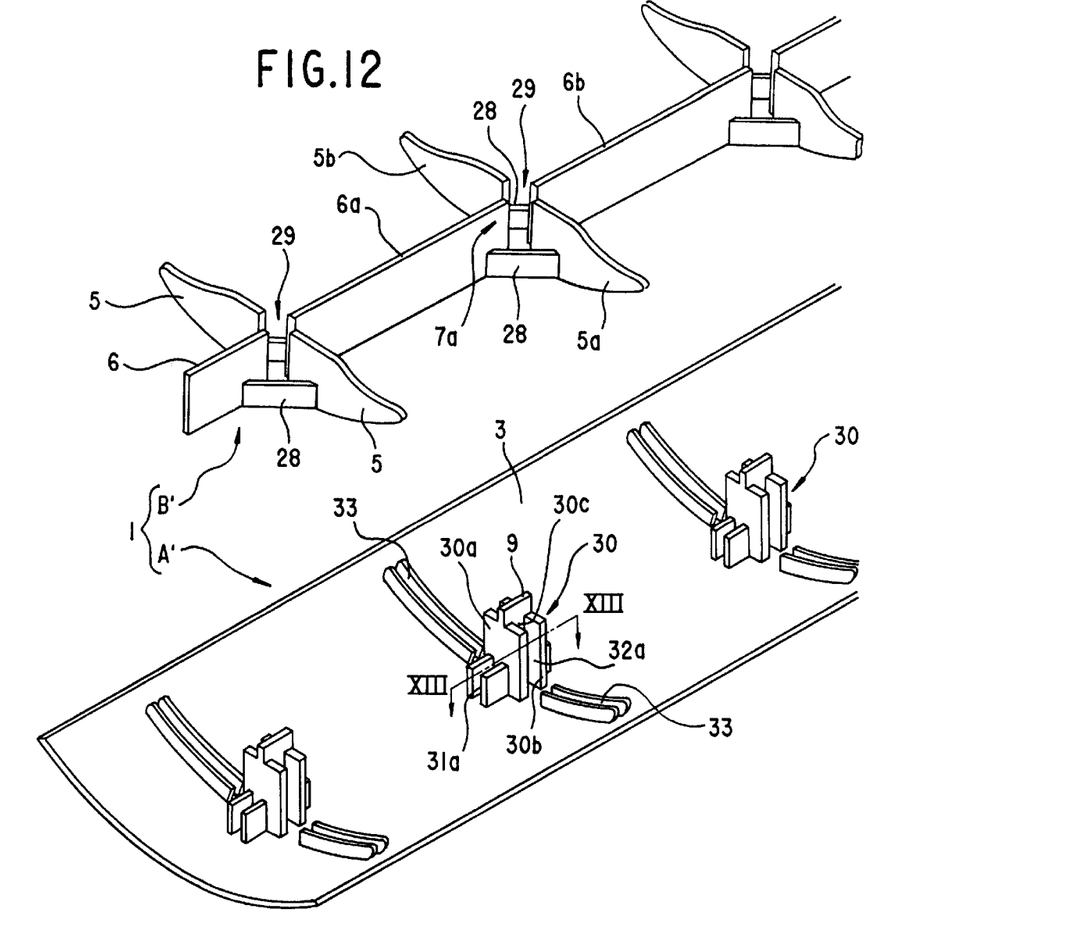
FIG. 12 is a disassembled perspective view similar to FIG. 10 showing further other embodiment of the invention.

FIG. 12 is a disassembled perspective view similar to FIG. 10 showing another embodiment in which the ribs and the garnish main body are formed separately. In this embodiment, the lateral ribs 5 and the longitudinal rib 6 of the rib structure body B' are cut apart into isolated pieces. At the crossing portion 7*a*, the upper and lower longitudinal rib parts 6*a*, 6*b* cut apart and the right and left lateral rib parts 5*a*, 5*b* cut apart are arranged end to end leaving a space, respectively, and these parts are connected integrally by four connecting pieces 28 forming a blank 29 in the center.

Figure 13:
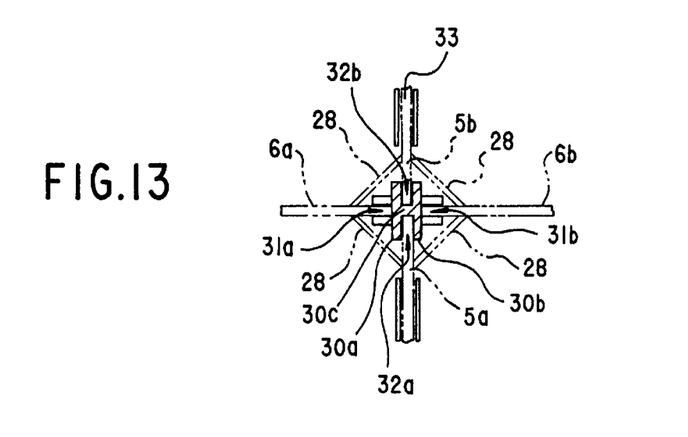
FIG. 13 is a sectional view along the line XIII—XIII of FIG. 12.

According to this embodiment, the pedestal portion to be formed at the crossing portion 7*a* is formed on the garnish main body A' side. That is, at a position on the back surface of the garnish design face 3 corresponding to the blank 29 of the rib structure body B' are formed integrally a pedestal piece 30 having a H-shaped section as shown in FIG. 13. On outside of the upper and lower face plates 30*a*, 30*b* are formed engagement grooves 31*a*, 31*b* engaging with the upper and lower longitudinal rib parts 6*a*, 6*b* respectively, and between the upper and lower face plates 30*a*, 30*b* are formed engagement grooves 32*a*, 32*b* engaging with the right and left lateral rib parts 5*a*, 5*b*. A web plate 30*c* of the pedestal piece 30 projects toward the car-body side to form the attachment piece 9 for fitting with the clip.

When the rib structure body B' is attached to the garnish design face 3, the pedestal piece 30 is fitted into the blank 29 engaging the longitudinal rib parts 6*a*, 6*b* with the engagement grooves 31*a*, 31*b* and the lateral rib parts 5*a*, 5*b* with the engagement grooves 32*a*, 32*b*. At this time, bottom edges of the lateral rib parts 5*a*, 5*b* are held by engaging with engagement grooves 33 formed on the surface of the garnish design face 3 and extending right and left from the pedestal piece 30. The rib structure body B' and the garnish main body A' assembled in the manner as described above are then fixed by hot-melt or adhesion for example. The assembled garnish 1 has similar constitution to that shown in FIG. 2 and exhibits similar performance.

What is claimed is:

1. A trim member for a vehicle to be provided in a passenger compartment of the vehicle, comprising:

a surface opposite to a structure member of a vehicle body at a distance;

a single longitudinal rib capable of elastic and plastic deformation formed on a lateral central portion of said surface along a longitudinal direction of the structural member;

a plurality of lateral ribs capable of elastic and plastic deformation formed on said surface so as to cross with said single longitudinal rib defining a plurality of the crossing portions;

a solid non-hollow pedestal portion extending from said surface to abut against the structural member of a vehicle body, said pedestal portion being formed on at least one of said crossing portions of said single longitudinal rib and said plurality of lateral ribs;

a plate-like attachment piece integrally formed on a top surface of said pedestal portion, said plate-like attachment piece existing and extending in the same plane as said single longitudinal rib; and a clip member fitted to said plate-like attachment piece and adapted to be engaged with an attachment hole provided on the structural member of a vehicle body.

2. The trim member for a vehicle as claimed in claim 1, wherein said single longitudinal rib and said lateral ribs are integrally formed on said surface of said trim member.

* * * * *